Nov. 11, 1952 R. U. CLARK Re. 23,570

QUASI-DETACHABLE MAGNETIC SYMBOLS, MARKERS, AND INSIGNIA

Original Filed July 21, 1948

INVENTOR.
Richard U. Clark
BY James R. Hooker
Attorney

Reissued Nov. 11, 1952

Re. 23,570

UNITED STATES PATENT OFFICE 23,570

QUASI-DETACHABLE MAGNETIC SYMBOLS, MARKERS, AND INSIGNIA

Richard U. Clark, Belmont, Mass.

Original No. 2,599,047, dated June 3, 1952, Serial No. 39,897, July 21, 1948. Application for reissue June 21, 1952, Serial No. 294,954

2 Claims. (Cl. 40—142)

Matter enclosed in heavy brackets [ ] appears in the original patent but forms no part of this reissue specification; matter printed in italics indicates the additions made by reissue.

The present invention concerns functional and decorative magnetic characters, symbols, predetermined insignia, or the like in the form of an attachment or marker or the like, and as such is of a semi-permanent nature. In other words it is to be easily attached to any surface that may also be of a magnetic character, or such that a magnet would be attracted thereto; but once attached it may not be readily removed except by a special predetermined method. The device must also not mar, scratch, or otherwise blemish fine surfaces to which it may be attached.

A more particular purpose of my invention is to provide a means for attaching initials, fluorescent or luminescent markers, reflectors, insignias, or the like, to automobile bodies, lockers, equipment, or other finished structures of a suitable or desired nature.

Where it is desired to provide a marker or identification plate or insignia for an auto, it is generally also desirable to have an attachment that may be removed at will, but one that will not jar off readily with rough usage or be easily removed by meddlers, or in an accidental manner nor for any climatic condition or the like.

In order to meet with the above requirements I have provided a magnetic piece having a smooth flat bottom surface, except for a small groove traversing a part of this bottom surface, the preferred position being nearly central thereto. The top surface of the piece is rounded off at all edges and corners, so that once affixed to a suitable surface, there remains no part where a grip or purchase can be had by means of which it might be removed. I may also coat the bottom surface with fine magnetic powder in such a way that it will conform upon attachment to irregular surfaces. This fine magnetic powder is applied as a normal coat and may be uniformly applied by dusting, brushing, or spraying operations. This coating would merely cover the base surface in such a manner that the body material is not visible thru the coating.

On the bulk of the top surface of the magnetic piece I may print, emboss, engrave, affix, or otherwise cause to be placed initials, monograms, insignia, symbols and so forth as may be desired, or may provide coatings that will glow as desired.

One simple form of my invention contemplates the molding, as by powder metallurgy methods, of the piece from magnetic material mixtures properly treated to obtain best magnetic properties for my use, and I may include in the pressing punches, used for compression of the powder, in the above method, suitable engravings or embossings that will provide the reversed impression in the finished piece.

As an alternative method I may provide a piece as described above, but without any characters or coatings on its top surface, and may coat the piece, or the top part of the piece with a suitable lacquer, plastic or other material, that may then be embosssed or printed with a pigment, burnt in or pressed in foil, or the like, as is common with paper, leather or the like. The proper coating or, if desired, plating of the piece may be done in such a manner as to make it unusually difficult to grip or grasp.

Figure 1:
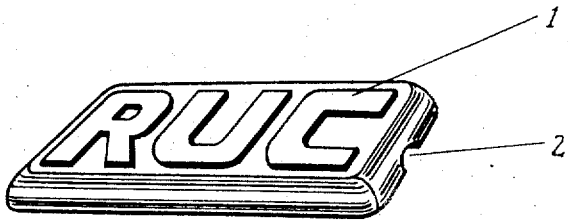
Fig. 1 is a plan view of my device showing the top and two side surfaces.
Figure 2:
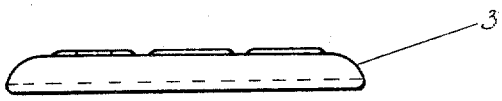
Fig. 2 is a side elevation of my insignia.

Referring now to the drawing, in Figure 1 a view of the top side and edges of the magnetic marker can be had showing embossed or raised lettering at 1 and part of the small groove as it emerges through the end from the bottom face can be seen at 2. This small groove 2 has been made part of the piece so that when it is desired to remove the piece from a surface to which it is attracted a fine wire thread or the like may be run through the groove to assist in pulling off or unseating the marker piece. I also take full advantage of this groove to provide air gaps to increase the external flux, and adapt it to the shape of my marker piece.

Figure 3:
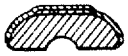
Fig. 3 is an end view of my device in cross-section.

Fig. 3 shows a section of my device in which the magnetic body material is coated over the entire non-base surface with a plastic material.

Figure 4:
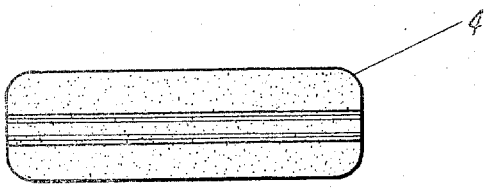
Fig. 4 is a bottom plan view of my device.

Fig. 4 shows the small groove in the bottom of my magnetic piece and the surface coated with fine magnetic powder.

Having described my invention, I claim:

1. A magnetic device of the kind described for attachment to a cooperating article, comprising the combination of permanently magnetized material, a preformed body, having a smooth base, said body being relatively flat and thin with exposed edges and corners smooth and sloping toward the base and presenting no surfaces whereby the body may be manually grasped and raised, said base being formed with a groove for the insertion of a removal tool, said base having a layer of magnetic powder thereon.

2. *A permanently magnetized insignia piece of the kind described for attachment directly to a supporting surface of magnetic material, comprising a pre-formed body of permanently magnetized material, having a smooth base, relatively flat and thin with exposed edges and corners smooth and sloping toward the base, said body being smoothly finish-coated and presenting no surfaces whereby said body may be manually grasped and raised, said base being formed with a relatively small thread-like groove sufficient for the insertion of a removal tool but small enough to prevent tampering therewith.*

RICHARD U. CLARK.

REFERENCES CITED

The following references are of record in the file of this patent or the original patent:

UNITED STATES PATENTS

| Number | Name | Date |
|---|---|---|
| 1,694,639 | Brown | Dec. 11, 1928 |
| 1,735,883 | Smith | Nov. 19, 1929 |
| 2,254,498 | Scharf | Sept. 2, 1941 |
| 2,431,827 | Rado | Dec. 2, 1947 |

FOREIGN PATENTS

| Number | Country | Date |
|---|---|---|
| 497,373 | Germany | May 8, 1930 |